(12) United States Patent
He et al.

(10) Patent No.: US 8,990,128 B2
(45) Date of Patent: Mar. 24, 2015

(54) GRAPH-BASED FRAMEWORK FOR MULTI-TASK MULTI-VIEW LEARNING

(75) Inventors: Jingrui He, Yorktown Heights, NY (US); David C. Gondek, Hawthorne, NY (US); Richard D. Lawrence, Ridgefield, CT (US); Enara C. Vijil, Kerala (IN)

(73) Assignee: International Business Machines Corporation, Armonk, NY (US)

( * ) Notice: Subject to any disclaimer, the term of this patent is extended or adjusted under 35 U.S.C. 154(b) by 242 days.

(21) Appl. No.: 13/488,885

(22) Filed: Jun. 5, 2012

(65) Prior Publication Data
US 2013/0325756 A1 Dec. 5, 2013

(51) Int. Cl.
*G06F 15/18* (2006.01)
*G06K 9/62* (2006.01)

(52) U.S. Cl.
CPC ..................................... *G06K 9/628* (2013.01)
USPC .......................................................... 706/12

(58) Field of Classification Search
None
See application file for complete search history.

(56) References Cited

U.S. PATENT DOCUMENTS

| | | | |
|---|---|---|---|
| 5,555,368 | A | 9/1996 | Orton et al. |
| 2004/0186762 | A1 | 9/2004 | Beaven et al. |
| 2008/0052358 | A1 | 2/2008 | Beaven et al. |

OTHER PUBLICATIONS

Sindhwani and Rosenberg, "An RKHS for Multi-View Learning and Manifold Co-Regularization", ICML '08 Proceedings of the 25th international conference on Machine learning, 2008, Jul. 5-9, 2008, pp. 976-983.*
Gao, Liang, Fan, Sun and Han, "Graph-based Consensus Maximization among Multiple Supervised and Unsupervised Models", Advances in Neural Information Processing Systems (NIPS), vol. 22, 2009, pp. 585-593.*
Cuturi, "Positive Definite Kernels in Machine Learning", arXiv:0911.5367v2 [stat.ML] for this version), Dec. 2009, pp. 1-51.*
He, Jingrui and Lawrence, Rick, "A Graph-based Framework for Multi-Task Multi-View Learning", Proceedings of the 28 th International Conference on Machine Learning, Bellevue, WA, USA, Jun. 28, 2011, pp. 1-8.*
Sridharan and Kakade, "An Information Theoretic Framework for Multi-view Learning", 21st Annual Conference on Learning Theory—COLT 2008, Helsinki, Finland, Jul. 9-12, 2008, pp. 1-12.*
He et al., "A Graph-based Framework for Multi-Task Multi-View Learning", Proceedings of the 28th International Conference on Machine Learning, Bellevue, WA, USA, 2011.
Li et al., "Graph Based Multi-Veiw Learning for CDL Relation Classification", 2009 IEEE International Conference on Semantic Computing, pp. 473-480.
Zhang, "Multi-Task Active Learning with Output Constraints", Proceedings of the Twenty-Fourth AAI Conference on Artificial Intelligence (AAAI-10), 2010, pp. 667-672.
Ganchev et al., "Multi-View Learning over Structured and Non-Identical Outputs", 2007.
Tominski et al., "CGV—An Interactive Graph Visualization System", DIMACS, Rutgers Univ., Piscataway, NJ, USA, Computers & Graphics, May 28, 2009, pp. 1-22.
Blum et al., "Combining Labeled and Unlabeled Data with Co-Training", Proceedings of the 1998 Conference on Computational Learning Theory.
ECML/PKDD Discovery Challenge 2006, http://www.ecmlpkdd2006.org/challenge.html, pp. 1-7, last printed Mar. 1, 2012.

* cited by examiner

*Primary Examiner* — Kakali Chaki
*Assistant Examiner* — Walter Hanchak
(74) *Attorney, Agent, or Firm* — Scully, Scott, Murphy & Presser, P.C.

(57) ABSTRACT

A system and method a Multi-Task Multi-View ($M^2TV$) learning problem. The method uses the label information from related tasks to make up for the lack of labeled data in a single task. The method further uses the consistency among different views to improve the performance. It is tailored for the above complicated dual heterogeneous problems where multiple related tasks have both shared and task-specific views (features), since it makes full use of the available information.

27 Claims, 9 Drawing Sheets

100

---
Algorithm 1 $IteM^2$ Algorithm
---
Input: $W_{ik}$, $a_{ik}$, $\mu_i$, $S_{ij}$, $y_{il}$, $i,j = 1,\ldots,T$, $k = 1,\ldots,V_i$, $l = 1,\ldots,m_i$, $b$, $n_{iter}$ Output: Predicted class labels $\hat{y}_{il}$, $i = 1,\ldots,T$, $l = m_i + 1,\ldots,n_i$ 1: Initialize using Algorithm 2
2:   for $t = 1$ to $n_{iter}$ do
3:     for $i = 1$ to $T$ do
4:       $S_i = \cup_{j=1}^T S_{ij}$
5:       for $k \notin S_i$ do
6:         $f_{ik} = L_{ik}^T g_i$
7:       end for
8:     end for
9:     for $k = 1$ to $V$ do
10:      Let $I_k$ denote the set of indices such that $\forall s \in I_k, \exists s' \in I_k, k \in S_{s,s'}$ and $\forall s' \notin I_k, k \notin S_{s,s'}$
11:      if $I_k$ is not empty then
12:        Calculate matrix $A_3$ using Equation (7)
13:        for $i = 1$ to $|I_k|$ do
14:          Set $f_{I_k(i)k}$ to be the $i^{th}$ column of $A_3$
15:        end for
16:      end if
17:     end for
18:   for $i = 1$ to $T$ do
19:     Set $a_i = \sum_{k=1}^{V_i} a_{ik}$ and $g_i = \frac{\mu_i}{\mu_i + a_i} y_i$
20:     for $k = 1$ to $V_i$ do
21:       $g_i = g_i + \frac{a_{ik}}{\mu_i + a_i} L_{ik} f_{ik}$
22:     end for
23:   end for
24: end for
25: Assign class labels using Algorithm 3

- 110 brackets lines 2–24
- 115 brackets lines 3–8
- 120 brackets lines 9–17
- 125 brackets lines 18–23

---
Algorithm 2 Initialization of $IteM^2$ Algorithm
---
Input: $W_{ik}$, $y_{il}$, $i = 1, \ldots, T$, $k = 1, \ldots, V_i$, $l = 1, \ldots, m_i$
Output: $T_{ik}$, $L_{ik}$ and the initial value for $g_i$, $i = 1, \ldots, T$, $k = 1, \ldots, V_i$
1: for $i = 1$ to $T$ do
2:    for $k = 1$ to $V_i$ do
3:       Calculate $T_{ik}$ and $L_{ik}$ based on Equation (1)
4:    end for
5:    Initialize $g_i$ such that $g_i(l) = y_{il}$, $l = 1, \ldots, m_i$, $g_i(l) = 0$, $l = m_i + 1, \ldots, n_i$
6: end for

---
Algorithm 3 Label Assignment of $IteM^2$ Algorithm
---
Input: $y_{il}$, $g_i$, $i = 1, \ldots, T$, $l = 1, \ldots, m_i$
Output: Predicted class labels $\hat{y}_{il}$, $i = 1, \ldots, T$, $l = m_i + 1, \ldots, n_i$
1: for $i = 1$ to $T$ do
2:    Set $p_i$ to be the proportion of positive examples in the labeled set of Task $i$
3:    Sort $g_i$ in descending order. Set $\hat{y}^{il} = 1$ for the top $p_i$ portion of the ranked list, and set $\hat{y}^{il} = -1$ for the remaining
4: end for

FIG. 5

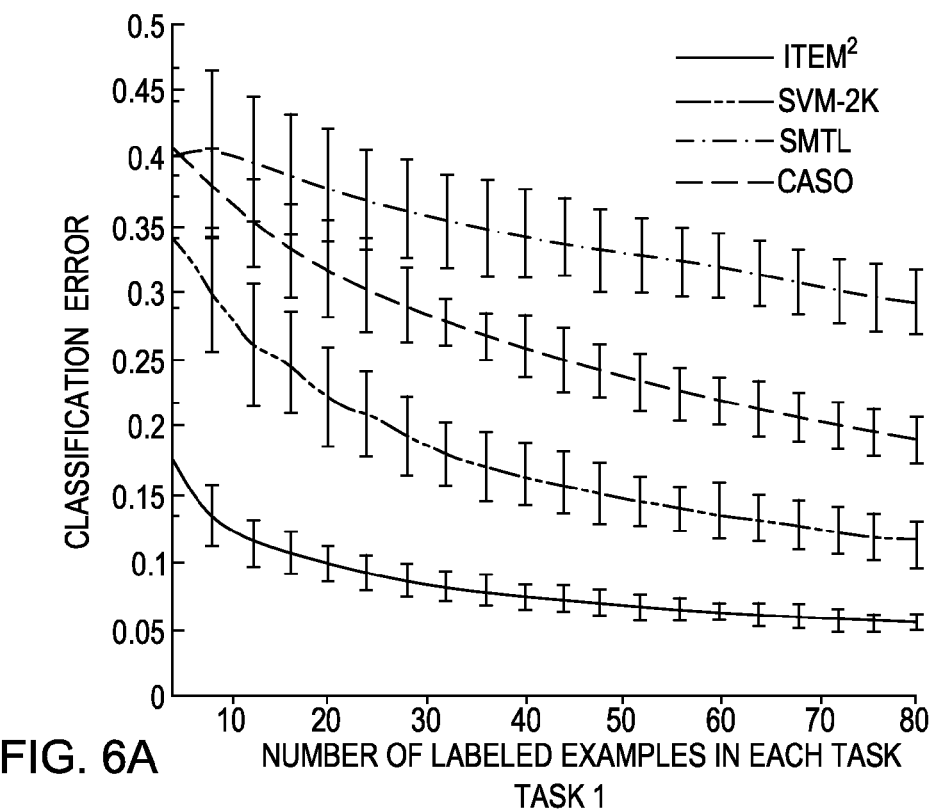
FIG. 6A TASK 1
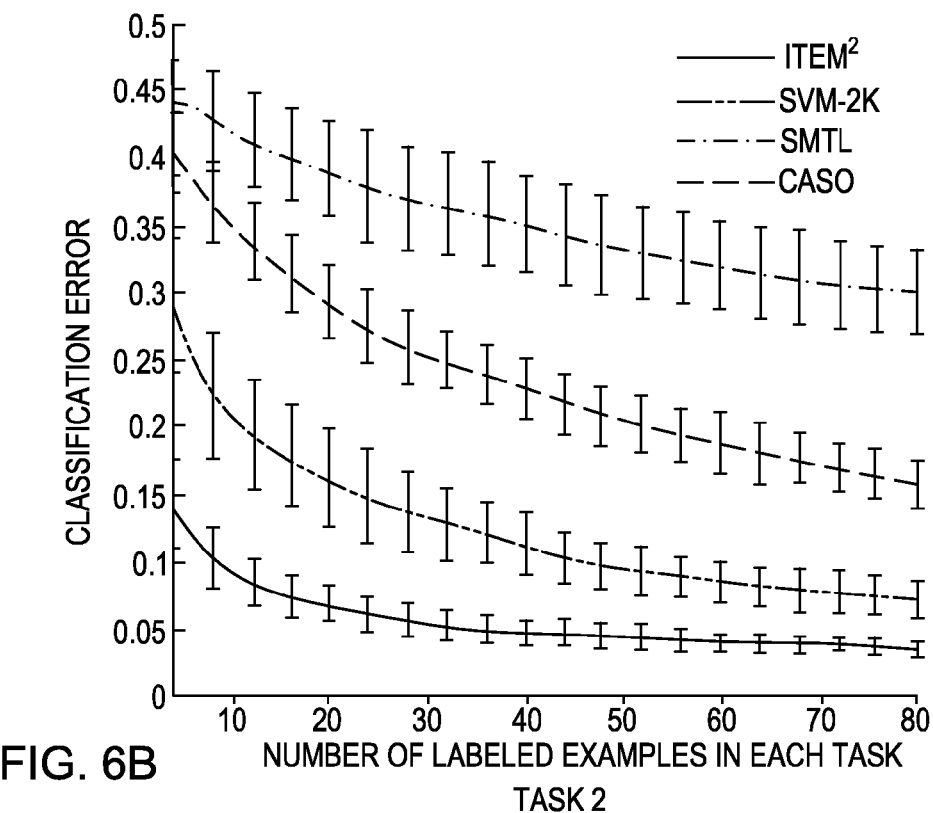
FIG. 6B TASK 2

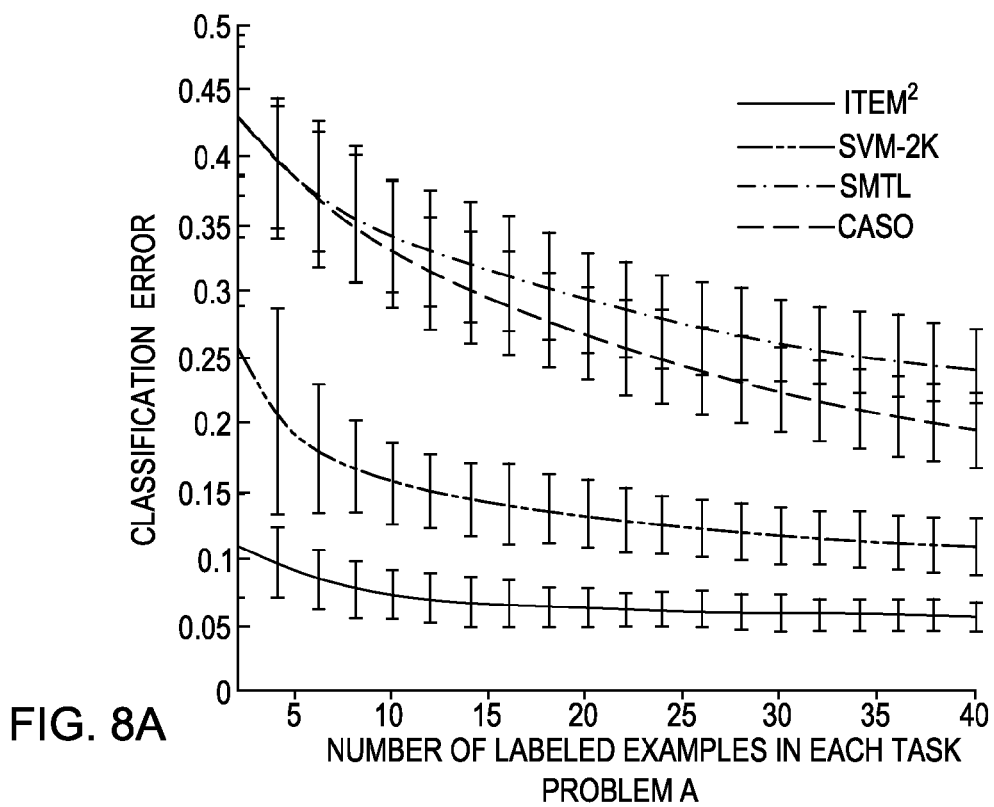
FIG. 8A  PROBLEM A
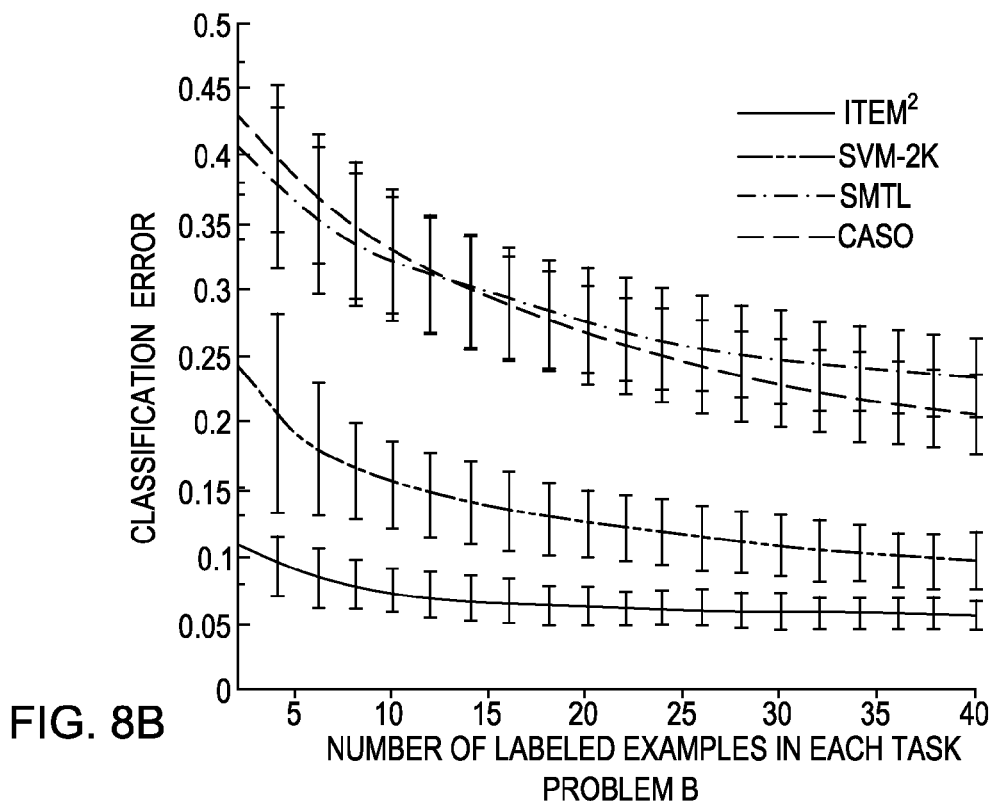
FIG. 8B  PROBLEM B

GRAPH-BASED FRAMEWORK FOR MULTI-TASK MULTI-VIEW LEARNING

BACKGROUND

The present disclosure relates to systems and methods for learning tasks and, a novel system and method for complicated learning problems with both feature heterogeneity and task heterogeneity.

Many real-world problems exhibit dual-heterogeneity. To be specific, a single learning task might have features in multiple views (i.e., feature heterogeneity); different learning tasks might be related with each other through one or more shared views (features) (i.e., task heterogeneity). For example, sentiment classification for movie reviews and for political blog posts are two related tasks. They both have the word features. However, political blog posts may have additional features based on the social network of the blog users. Another example is depicted as an illustration in FIG. 1 directed to multi-lingual web image annotation 10, where images 12 collected from Chinese web sites and images 15 collected from English web sites both have content-based features (image features, e.g., as represented by a color histogram), and they also have task-specific features, i.e., surrounding texts 22 in Chinese and surrounding texts 25 in English, respectively.

Neither multi-task learning nor multi-view learning alone is optimal for such complicated learning problems.

As known, the basic idea of multi-view learning is to make use of the consistency among different views to achieve better performance. In multi-task learning, people model task relatedness in various ways.

Existing multi-task learning explores the relatedness with other tasks, but disregards the consistency among different views of a single task; whereas existing multi-view learning ignores the label information from other related tasks.

There does not exist an effective learning method to fully explore both the feature heterogeneity and the task heterogeneity simultaneously. This is partially due to the fact that existing multi-task learning and multi-view learning algorithms adopt quite different methodologies.

It would be highly desirable to provide a system and method that provides for and solves novel Multi-Task Multi-View learning problems.

SUMMARY

A system, method and computer program product that relies on both feature heterogeneity and task heterogeneity simultaneously for solving a learning problem is provided. The system and method seamlessly bridges Multi-Task learning and Multi-View ($M^2TV$) learning methods together to solve learning problem.

The Multi-Task Multi-View ($M^2TV$) learning problem on one hand, uses the label information from related tasks to make up for the lack of labeled data in a single task; on the other hand, it uses the consistency among different views to improve the performance. It is tailored for the complicated dual heterogeneous problems where multiple related tasks have both shared and task-specific views (features), since it makes full use of the available information.

For $M^2TV$ learning, there is described a graph-based framework ($GraM^2$). Within each task, there is constructed a bipartite graph for each view, modeling the relationship between the examples and the features in this view. The consistency among different views is obtained by requiring them to produce the same classification function, which is commonly used in multi-view learning. Across different tasks, their relationship is established by imposing the similarity constraint on the common views. Furthermore, an iterative algorithm ($IteM^2$) is proposed to solve the $GraM^2$ framework.

There is provided a system, method and computer program product for classifying entities from multiple channels in multi-task multi-view learning problems, said entities of different tasks being related with each other through shared features in multiple views and a single learning task relating to a task specific feature in multiple views. The method comprises: generating a bi-partite graph-based model relating one or more examples and features in each the view; forming an objective function to impose consistency of each task and similarity constraints on common views of different tasks based on graphs generated from the model, wherein for each task, a first function g( ) is defined on entities which takes on class label values; and, a second function f( ) is defined on each view which takes values on the features in the view, the second function feature values used to determine the class label of an entity having such features; iteratively solving the objective function over each the task to obtain values for the first functions and second functions; and, generating labels that classify the entities based on obtained values for the first functions, wherein as programmed processor device is configured to perform one or more of the model generating, the forming, the iteratively solving and the label generating.

A computer program product is provided for performing operations. The computer program product includes a storage medium readable by a processing circuit and storing instructions run by the processing circuit for running a method(s). The method(s) are the same as listed above.

BRIEF DESCRIPTION OF THE DRAWINGS

The above and further advantages of the present invention may be better understood by referring to the following description in conjunction with the accompanying drawings, in which:

FIG. 3 is a pseudo-code depiction of a method for solving an optimization problem (i.e., objective function) for the graph-based framework ($GraM^2$) for $M^2TV$ learning according to one embodiment;

FIG. 4 is a pseudo-code depiction of a further method for initializing variables including calculating a normalized affinity matrices and initializing function $g_i(\bullet)$ defined on examples used for the classification according to an example embodiment;

FIG. 5 is a pseudo-code depiction of a further method for assigning predicted class labels for use in the first method of FIG. 2 according to an example embodiment; and, FIGS. 6A and 6B illustrate the comparison results comparing the $IteM^2$ classifying method to an example three problems for respective two (2) tasks with non-identical views example case where a computed classification error is depicted for the 20 newsgroups data set of the example;

DETAILED DESCRIPTION

There is introduced a novel problem named Multi-Task Multi-View learning (M²TV), where multiple related tasks have both shared and task-specific views, and a solution for solving such multi-task learning/multi-view learning problems.

Figure 1:
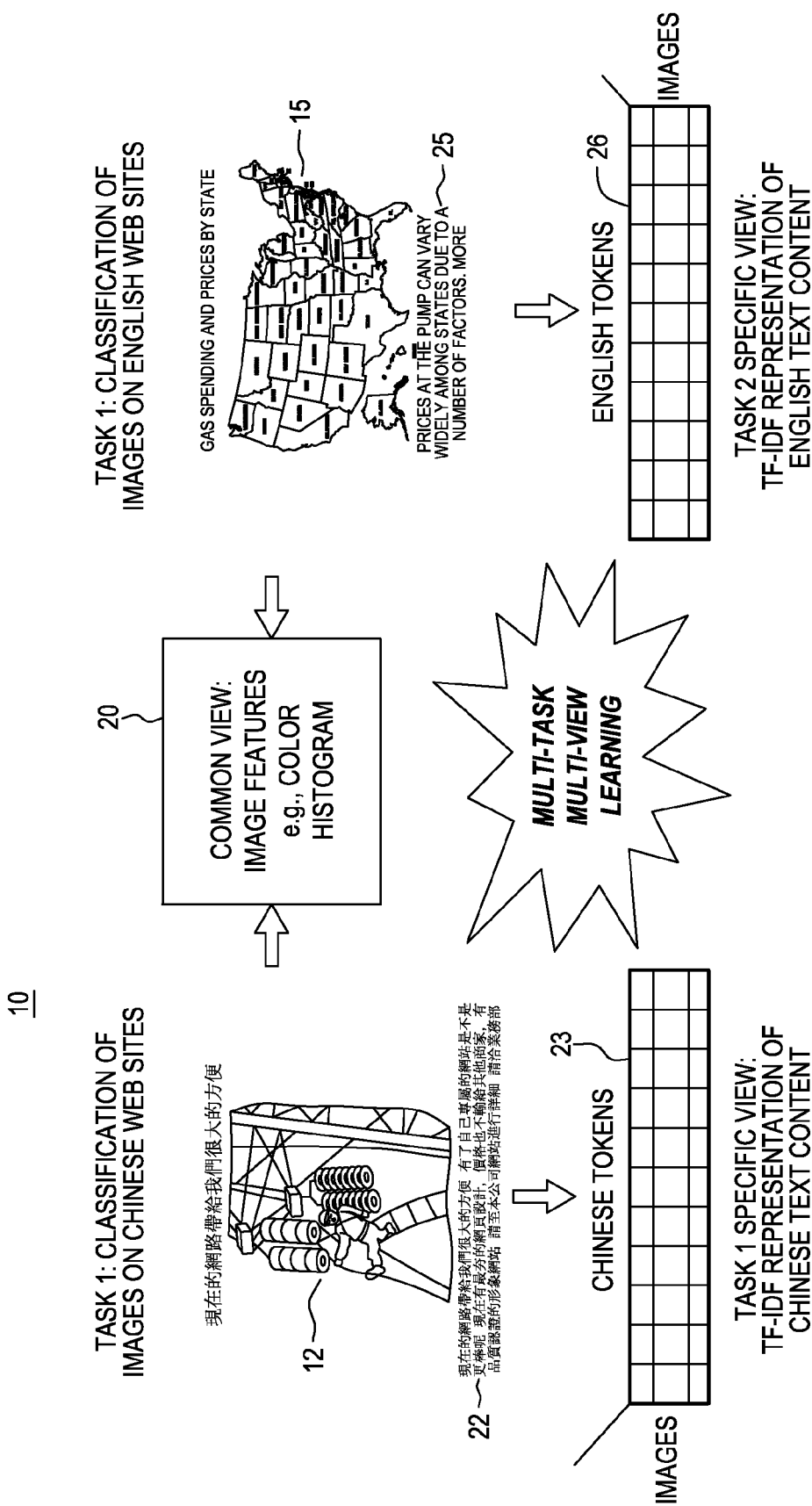
FIG. 1 is a diagram illustrating a non-limiting $M^2TV$ learning problem 10 including multiple related tasks having both shared and task-specific views.

For example, in a task of classifying web sites as depicted in the illustrative example 10 of FIG. 1, a Task 1 involves classifying images on Chinese Web-sites while a Task 2 involves classifying images on English Web-sites. Task 1 provides two (2) views: 1) low-level image feature (e.g., photograph 12), and view 2) textual features extracted from content surrounding the image (e.g., the Chinese language text characters 22 being mapped to tokens 23 representing word stem(s)), e.g., resulting from applying TF-IDF processing of Chinese text content surrounding the image. Likewise, in FIG. 1, the Task 2 involving classifying images on English web-sites provides two views: 1) low-level image feature (e.g., graphic object 15), and view 2) textual features (e.g., the English language text 25 mapped to tokens 26 representing word stem(s)), e.g., resulting from applying TF-IDF processing of English text extracted from content surrounding the images. Thus, in multi-view, multi-task learning, for classifying web-sites, for each Task, an example view 1 involves classifying images according to its low level image features extracted from images, e.g., color histogram, texture, or shape; and an example view 2 consists of features extracted from text surrounding images as represented by language tokens that span a highly dimensional feature space. Thus, from processing Task 1 and 2 textual feature views (e.g., view 2) there is obtained a highly dimensional feature vector with each element(s) (e.g., a word) having a value if mapped to a corresponding token(s). These view 2 tasks are task specific views as Chinese characters can not be mapped to English language token, and vice versa, English characters can not be mapped to Chinese character tokens.

A common view in this example of FIG. 1 would thus include the low-level image features of each picture(s) or images on a web-site, e.g. a color histogram including a vector of color values. These image feature values, for example, may be output and used to differentiate the images, e.g., cartoon or graphic, or a real photograph. For example, as an output of the classification processing, using the low-level image features, web-sites having cartoon images may be assigned a first label (e.g., a value −1), while web-sites having photographic images may be assigned a second label (e.g., +1). Thus, in the classifying problem of classifying images on web-sites, each image in the site may be assigned a label, for each of many pluralities of web-sites.

To solve a multi-task learning nor multi-view learning problem a graph-based framework (GraM²) for M²TV learning is implemented. Further there is provided an effective algorithm (IteM²) for the GraM² framework where it can be shown that IteM² converges to an optimal solution in a scalable way.

In M²TV learning, there is also performed multi-view learning within a single task. In addition, use is made of the label information from other related tasks, which is particularly useful when the number of labeled examples in a single task is very small. Further in M²TV learning, there is also performed multi-task learning via the common views shared by different tasks. In addition, the method and system is able to leverage the consistency among different views of a single task to achieve better performance.

M²TV: Problem Definition

Suppose that there is T tasks and V views in total. Each task has $V_i$ views, $1 \le V_i \le V$, $i=1, \ldots, T$. Each view corresponds to a type of feature, e.g., bag of words, linkage among the examples, etc. For the i th task and the k th view, there are $d_{ik}$ features. Let $S_{ij}$ denote the set of indices of common views shared by the i th and j th tasks. $S_{ii}=\phi$. For example, $S_{12}=\{1\}$ means that Task 1 and Task 2 share the first view. If $1 \in S_{12}$, and $1 \in S_{13}$, then $1 \in S_{23}$.

For the i th task, there is $n_i$ examples, which are denoted $X_i=\{x_{i1}, \ldots, x_{in_i}\} \subset \Re \Sigma_{k=1}^{V_i} d_{ik}$. In one embodiment, it is assumed that that the features are non-negative, e.g., word frequency in document classification. Without loss of generality, suppose that the first $m_i$ examples are labeled $y_{i1}, \ldots, y_{im_i}$, which are either 1 or −1. Note that $m_i$ is usually very small compared with $n_i$. One goal is to leverage the label information from all the tasks to help classify the unlabeled examples in each task, as well as to use the consistency among different views of a single task to improve the performance (e.g., decrease classification error when classifying entities with labels).

GraM²: A Graph-Based Framework

A graph-based framework (GraM²) is provided for M²TV learning. There is first presented its objective function. Then it is shown how it can be reduced to standard supervised learning via an RKHS.

In the GraM² framework, there is two types of functions defined: "G( )" and "F( )". Function G( ) is defined on the examples (entity nodes). To be specific, for the i th task, there is defined function $g_i(\bullet)$, which takes values on $x_{i1}, \ldots, x_{in_i}.g_i(\bullet)>0$ indicates a positive class label whereas $g_i(\bullet)<0$ indicates a negative class label. The other function F( ) is defined on the features (feature nodes). To be specific, for the i th task and the k th view, define function $f_{ik}(\bullet)$, which takes values on the features in this view. $f_{ik}(\bullet)$ helps determine the class label of an example having such features. Take sentiment classification as an example. $f_{ik}(\bullet)>0$ indicates positive polarity of a word whereas $f_{ik}(\bullet)<0$ indicates negative polarity. The polarity of all the words in a document together will determine the sentiment of the document. Furthermore, if $|f_{ik}(\bullet)|$ is large, then the corresponding word often has strong polarity; on the other hand, if $|f_{ik}(\bullet)|$ is small, then the corresponding word has weak polarity, which may even have conflicting polarity in different context.

Figure 2:
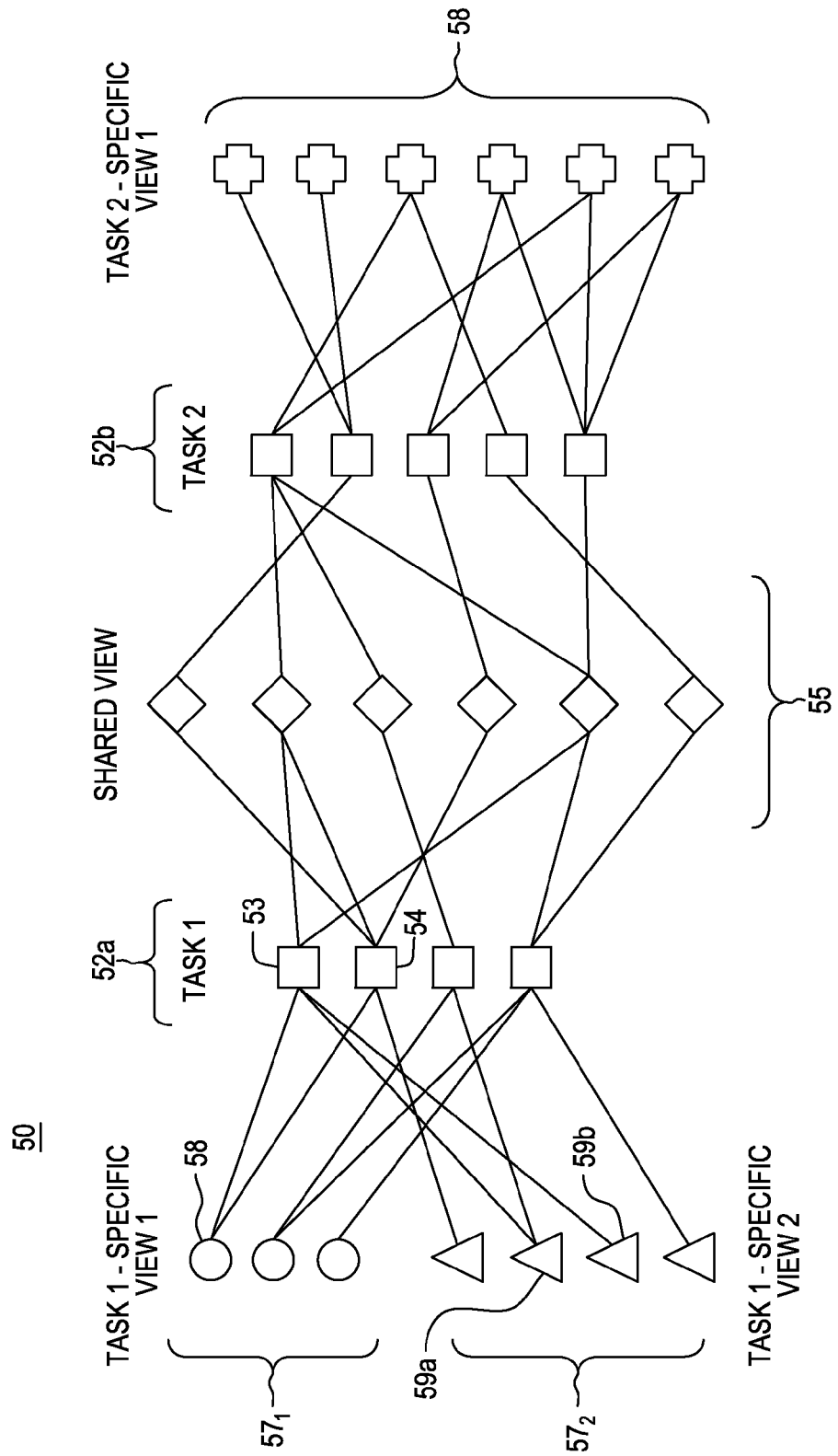
FIG. 2 particularly illustrates a bi-partite graph structure 50 for the $M^2TV$ learning problem example of FIG. 1.

For the i th task and the k th view, there is constructed a bipartite graph $G_{ik}=\{N_{ik}, E_{ik}\}$ where $N_{ik}$ is the set of nodes and $E_{ik}$ is the set of undirected edges. $N_{ik}$ consists of two types of nodes, i.e., the nodes that correspond to the examples in this task, and the nodes that correspond to the features in this view. There is an edge between an example node and a feature node if and only if the feature value for the example is positive, and the weight of the edge is just the feature value. FIG. 2 shows an example of such bipartite graphs.

FIG. 2 particularly illustrates a bi-partite graph structure 50 for the M²TV learning example 10 of FIG. 1. In FIG. 2, Task 1 and Task 2 (black squares 52A, 52B) have both a shared view (diamonds 55) and the task specific views (circles $57_1$ and triangles $57_2$ for the two views of Task 1, and pluses 58 for the view of Task 2). The weight of an edge between an example entity node (nodes black squares 52A, 52B) and a feature node (57₁, 57₂, 58) is set to the feature value. Feature nodes attach to entity nodes based on whether that entity has that corresponding feature. If so, an edge (having an associated weight) connects the feature of the entity node.

For non-limiting purposes of explanation, bi-partite graph-based structure 50 of FIG. 2 depicts the example M²TV learning problem 10 of FIG. 1. As referred to herein, examples or entities refer to the objects that are to be classified or assigned a score (e.g., for regression tasks). Further, as used herein, channels refer to various sources of information for describing entities/examples. The labeled examples are provided as inputs to the programmed algorithm described herein with respect to FIG. 3. In FIG. 1, square elements 52A represent the entities in Task 1, e.g., images in Chinese Web-sites; while elements 52B represent the entities in Task 2, e.g., images in English Web-sites. The shared view elements 55 (e.g., diamonds) represent the features in the shared view, e.g., low-level image features such as a color histogram. Thus, if there are 36 shared color features, these will be represented by 36 elements in set 55. Task specific views (represented as circles 57₁ and triangles 57₂) are shown for the two views of Task 1, and pluses 58 represent the view of Task 2. It is understood that, for each Task 52A, 52B there is no limit as to how many specific views each can have. The weight of an edge between an example entity node (nodes black squares 52A, 52B) and a feature node (57₁, 57₂, 58) is set to the feature value. Feature nodes attach to entity nodes based on whether that entity has that corresponding feature. If so, an edge (having an associated weight) connects the feature of the entity node.

In the example, the features 57₁ in Task 1 specific view 1 may correspond to the Chinese tokens obtain from text mapping, while the features 57₂ in Task 1 specific view 2 may correspond to the TF-IDF representation of Tweets (e.g., represented by tokens), for example, in a user's the social network. Likewise, Task 2, specific view may comprise features 58 corresponding to, for example, the English tokens obtain from text mapping.

As shown in example graph 50, FIG. 2, a word feature (Chinese token) 58 in the Task 1 specific view nodes 57a indicates a common feature with two of the entity nodes 53, 54, i.e., first two entity nodes (Chinese Web-site images) 53, 54 in Task 1, both have a common textual word feature (e.g. a word token) as indicated by graph edges joining feature node 58 of task 1 specific view 1 nodes 57₁ to respective entity nodes 53, 54 in FIG. 1. Additionally, entity node 53 in Task 1 (e.g., an image) indicates having two common word features with a social network (e.g. word token entries) as indicated by respective graph edges from entity node 53 joining feature nodes 59a, 59b of Task 1 specific view 2 nodes 57₂ in FIG. 2.

This model information is represented as computer data structures accessed and processed by a programmed computing system, e.g., implementing MATLAB available from Mathworks™ (http://www.mathworks.com/products/matlab/). For the example shown in FIG. 2, it is desired in one example embodiment, to classify all the images of the Chinese web-site. It may be the case that several classification labels exist for some of the images on Chinese web-sites Task 1 and English web-sites Task 2 (e.g., cartoon (−1 label) or real photograph (+1 label)). However, in an exemplary problem, all remaining Task 52A, 52B entities (e.g., images) need to be classified and one example application is to obtain labels for all Chinese and English web-sites according to the bi-partite graph. In the solution to this problem, a function is defined on both the entity nodes and the features node.

Generally, in the method for M²TV learning, a graph-based framework is built. Within each task, there is constructed a bipartite graph for each view, modeling the relationship between the examples and the features in this view. The consistency among different views is obtained by requiring them to produce the same classification function, which is commonly used in multi-view learning.

Across different tasks, their relationship is established by imposing the similarity constraint on the common views. Furthermore, an iterative algorithm is proposed to solve the framework. On one hand, Multi-Task Multi-View learning uses the label information from related tasks to make up for the lack of labeled data in a single task; on the other hand, it uses the consistency among different views to improve the performance. It is tailored for the complicated dual-heterogeneous problems where multiple related tasks have both shared and task-specific views (features), since it makes full use of the available information.

With respect to the data representations of a bi-partite graph structure, let $W_{ik}$, $(n_i+d_{ik}) \times (n_i+d_{ik})$, denote the affinity matrix for $G_{ik}$ having the following structure:

$$W_{ik} = \begin{bmatrix} 0_{n_i \times n_i} & A_{ik} \\ A_{ik}^T & 0_{d_{ik} \times d_{ik}} \end{bmatrix}$$

where $A_{ik}$ is an $n_i \times d_{ik}$ matrix. If the t th feature of the s th example is positive, then $A_{ik}(s, t)$ (the element of $A_{ik}$ in the s th row and t th column) is set to be this feature value. Furthermore, $W_{ik}$ is normalized to obtain:

$$T_{ik} = D_{ik}^{-1/2} W_{ik} D_{ik}^{-1/2} \tag{1}$$

where $D_{ik}$ is a diagonal matrix whose s th element $D_{ik}(s)$ is equal to the sum of the s th row of $W_{ik}$.

On bipartite graph $G_{ik}$, there is observed label consistency among the nodes. To be specific, a positive example (i.e., $g_i(\bullet) > 0$) should be connected with positive features (i.e., $f_{ik}(\bullet) > 0$) and vice versa. In a more principled way, the consistency is measured by $$C_{ik} = \sum_{s=1}^{n_i} \sum_{t=1}^{d_{ik}} A_{ik}(s,t) \left( \frac{g_i(s)}{\sqrt{D_{ik}(s)}} - \frac{f_{ik}(t)}{\sqrt{D_{ik}(n_i+t)}} \right)^2$$

$$= \|g_i\|^2 + \|f_{ik}\|^2 - 2g_i^T L_{ik} f_{ik}$$

where $L_{ik}$ is an $n_i \times d_{ik}$ matrix, and its element in the s th row and t th column $L_{ik}(s, t) = T_{ik}(s, n_i+t)$.

In this way, for Task i, there is had $V_i$ such bipartite graphs, which correspond to $C_{i1}, \ldots, C_{iV_i}$. Therefore, the overall consistency of Task i is measured by $$C_i = \sum_{k=1}^{V_i} a_{ik} C_{ik} + \mu_i \|g_i\| - \|y_i\|^2$$

where $a_{ik}$, $\mu_i$ are positive parameters, and $y_i$ is an $n_i$-dimensional vector. The first $m_i$ elements of $y_i$ are set to be the class labels of the corresponding examples, and the remaining elements are set to be 0. In $C_i$, the first term implicitly measures the consistency among different views since the function $g_i(\bullet)$ is shared by all the bipartite graphs, and the second term measures the consistency with the label information.

On the other hand, if Task i and Task j are directly related, i.e., $S_{ij} \neq \phi$, it is hoped to observe similarity on the common views of the two tasks. To be specific, $\forall k \in S_{ij}$, $\|f_{ik} - f_{jk}\|^2$ should be small. In this way, given a certain task, the information of other related tasks can be leveraged to improve its performance.

Combining the overall consistency of each task and the similarity on the common views of different tasks, there is obtained the following objective function for GraM².

$$Q(f, g) = \sum_{i=1}^{T} C_i + b \sum_{i=1}^{T} \sum_{j=1}^{T} \sum_{k \in S_{ij}} \|f_{ik} - f_{jk}\|^2 \qquad (2)$$

where $f$ is function defined on feature node, and g is function defined on entity nodes, and where b is a non-negative parameter. When b=0, different tasks are decoupled.

FIG. 3 provides an effective method (IteM²) 100 for solving this optimization problem.

The proposed IteM² algorithm 100 of FIG. 3 programmed for example, in MATLAB, works as follows: Step (1) is an initialization step, where using the algorithm 200 depicted in FIG. 3, there is calculated the normalized affinity matrices using Equation (1), and initialize the function $g_i$ for Task i to include the label information. Referring back to FIG. 3, at 110 corresponding from Steps (2) to (24), there is repeatedly updated both the function $g_i$ and the function $f_{ik}$ by $n_{iter}$ times. In particular, at 115, corresponding to steps (3)-(8) there is depicted that portion of the solution that iterates over the number of tasks; and, at each iteration, updates the function f( ) defined on each view for the task-specific non-shared views defined for each task.

Then, at 120 between Steps (9) and (17), there is depicted that portion of the solution that iterates over the number of views, determines at each iteration whether a current view is shared by a task; and if determined that the current view is shared, updating the function f( ) defined on the view for the shared view. More particularly, for the k th view, there is collectively updated the functions $f_{ik}$ for the tasks with this view. To be specific, the matrix $A_3$ is calculated as follows:

$$A_3 = A_2 A_1^{-1} \qquad (3)$$

where $A_1$ denotes an $|I_k| \times |I_k|$ matrix with diagonal element $A_1(i,i)$ set to $a_{I_k(i)k} + 2b(|I_k|-1)$, ($I_k(i)$ is the $i^{th}$ element of $I_k$), and the other elements set to $-2b$; $A_2$ denotes an $d_k \times |I_k|$ matrix whose $i^{th}$ column is set to $a_{I_k(i)k} L_{I_k(i)k}^T g_{I_k(i)}$.

Then, returning to 225, FIG. 1 corresponding to steps (18)-(24), there is depicted iterating over the number of tasks i, calculate an intermediate parameter and update the function g( ) defined for each task as a function of the calculated intermediate parameter and sub-matrix ($L_{ik}$) of the normalized affinity matrix and the updated function f( ).

Finally, in Step (25), there is obtained the predicted class labels using the algorithm of 300 of FIG. 5, which normalizes the function $g_i$ according to the proportion of both classes in the labeled set of each task. For example, there is calculated a percentage of examples having positive label values in an initial set of examples. For example, as a result of processing algorithm 100, the functions g( ) are sorted according to their values in a descending order; and then the top g( ) functions are assigned a same positive label to according to the example percentage, and the remaining functions g( ) are assigned the opposite label values.

The optimality and convergence of the iteration process between Step (2) and (25) of IteM² algorithm is guaranteed. That is, it can be proved that If $n_{iter}$ is sufficiently large, $V_i = v$, $\mu_i = \mu$, and $a_{ik} = a$, i=1, . . . , T, k=1, . . . , v, Step (2) to (25) of IteM² converge to the optimal solution of Equation (2).

An example as to the effectiveness of the classification function according to the IteM² method is now described. In one, non-limiting example experiment, there is applied a SVM-2K algorithm such as described in a reference to J. D. R. Farquhar et al. entitled "Two view learning: SVM-2K," Theory and Practice. NIPS, 2005 on the multiple views of each task respectively; with other conventional techniques, e.g., SMTL such as described in a reference to Qiuhua Liu et al. entitled "Semi-Supervised Multitask Learning", *NIPS*, 2007—a semi-supervised multi-task learning framework, which uses unlabeled data based on Markov random walk, and CASO such as described in a reference to Jianhui Chen et al. entitled "A convex formulation for learning shared structures from multiple tasks" *ICML, pages* 18, 2009—: a multi-task learning algorithm—applied on the common views of all the tasks. To provide a fair comparison, the output of these competitors are adjusted in the same way. All the experiments are repeated a multiple of times, and report both the average classification error and the standard deviation.

For the proposed IteM² algorithm, there is initially set $a_{ik} = 1$, i=1, . . . , T, k=1, . . . , $V_i$ since there is no evidence showing the superiority of one view or another. In one embodiment, there is set $\mu_i = 0.01$, i=1, . . . , T. The number of iteration steps $n_{iter}$ is set to 100, for example, and parameter b is set to 1 in the example.

Two Tasks with Non-Identical Views

In an example directed to two tasks with non-identical views, there is first performed experiments on 20 newsgroups data set. On this data set, three (3) problems were created, each problem having 2 tasks, which share a common view consisting of the common vocabulary. The task specific vocabulary corresponds to the unique view of each task. Therefore, in this example, there is set T=2, V=3, $V_1 = V_2 = 2$, $S_{12} = \{1\}$. Table 1 provides a task description for 20 newsgroups data set details of the data set, where the number following 'P' denotes the problem index, the number following 'T' denotes the task index, and the number in the parenthesis is the number of examples.

TABLE 1

| LABEL | +1 | −1 |
|---|---|---|
| P1T1 | COMP. GRAPHICS (581) | RE. AUTOS (592) |
| P1T2 | COMP.OS. MS-WINDOWS.MISC (572) | REC.MOTORCYCLES (596) |
| P2T1 | COMP.SYS.IBM. PC.HARDWARE (587) | SCI.MED (594 |
| P2T2 | COMP.SYS.MAC. HARDWARE (575) | SCI.SPACE (593) |
| P3T1 | REC.AUTOS (592) | TALK.POLITICS.MIDEAST (564) |
| P3T2 | REC.MOTORCYCLES (596) | TALK.POLITICS.GUNS (545) |

For this example, the results of IteM² when the value of b are varied from 100 to 0 indicate that when b=0, the performance is the worst, especially when the number of labeled examples from each task is small. This is because the label information from other tasks is not utilized. On the other hand, the performance of IteM² is quite robust over a wide range of values for b. Therefore, in subsequent experiments, b=1.

FIGS. 6A and 6B are illustrative of the comparison results on the three problems. That is, the representative results shown in FIG. 6A indicate the classification error for Task 1 vs. the number of labeled examples in each task, and the results shown in FIG. 6B indicate the classification error for Task 2 vs. the number of labeled examples in each task. From FIGS. 6A and 6B, it is seen that the performance of IteM$^2$ is the best on both tasks, since SVM-2K does not utilize the label information from other tasks, whereas SMTL and CASO techniques do not consider the consistency among different views of a single task. Furthermore, it is noticed that the difference between SVM-2K and IteM$^2$ is significant when the number of labeled examples is small. This observation, is consistent because labeled examples from other tasks are particularly useful when there are not many labeled examples in a single task.

Multiple Tasks with Identical Views

Figure 7:
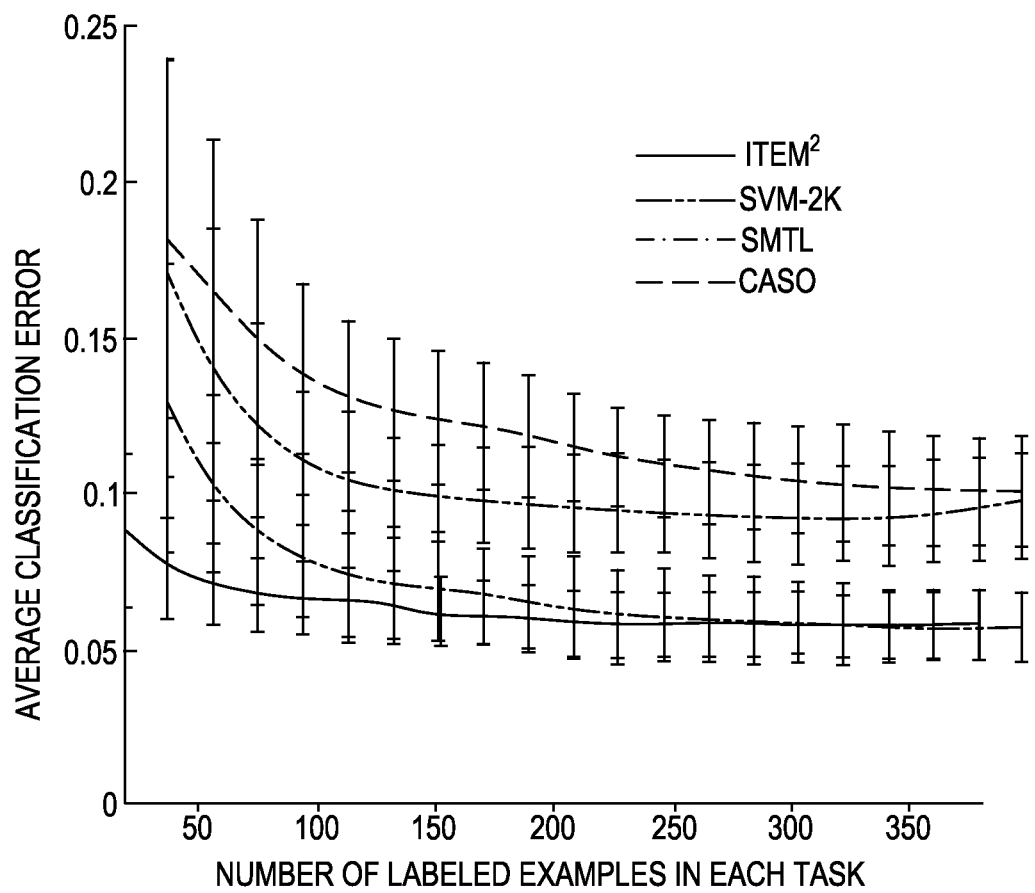
FIG. 7 shows comparison results of the average classification error computed for an example WebKB dataset highlighting improved performance of $IteM^2$ classifying for example case of Multiple tasks with Identical Views; and, FIGS. 8A and 8B each shows an average classification error of all the tasks vs. the number of labeled examples in each task for Problem A and B, respectively.

As a further example, the performance of IteM$^2$ was tested on a "WebKB" data set, which was used to study a co-training algorithm as described in a reference to Avrim Blum et al. entitled "Combining Labeled and Unlabeled Sata with Co-Training", *COLT*, 1998. This data set consists of 1051 web pages collected from the computer science departments of several universities. The goal is to classify each web page as either "course" related or non-course related. On this data set, there are four (4) tasks, each of which consists of the web pages from one university. For each task, there is had three (3) views, which correspond to the words in the web page, the words in the anchor text of hyperlinks pointing to that page, and the words in the title of the web page. It is noted that all 3 views are shared by the 4 tasks. Therefore, T=4, V=3, $V_i$=3, and $S_{ij}$={1, 2, 3}, i, j=1, . . . , 4, i≠j. Notice that for such problems (multiple tasks with identical views), the input to IteM$^2$, SMTL and CASO are the same since all the tasks have identical views. FIG. 7 shows an average classification error of all the tasks vs. the number of labeled examples in each task. As shown in FIG. 7, the performance of IteM$^2$ is significantly better than SMTL and CASO, due to leveraging the consistency of multiple views.

Multiple Tasks and Non-Identical Views

A more general case is now described where there is had multiple tasks with non-identical views. To this end, a email spam data set from ECML 2006 discovery challenge (see, http://www.ecmlpkdd2006.org/challenge.html) is used. In this example, there is had two problems. In Problem A, there are emails from 3 different users (2500 emails per user); whereas in Problem B, there are emails from 15 different users (400 emails per user). The goal is to classify spam vs. ham. For both problems, there is create different tasks for different users. The common view of all the tasks correspond to the common vocabulary, and the unique view of each task correspond to the task-specific vocabulary. Therefore, for Problem A, T=3, V=4, $V_1$=$V_2$=$V_3$=2, and $S_{12}$=$S_{13}$=$S_{23}$={1}; for Problem B, T=15, V=16, $V_i$=2, and $S_{ij}$={1}, i, j=1, . . . , 15, i≠j.

FIGS. 8A and 8B each shows an average classification error of all the tasks vs. the number of labeled examples in each task for Problem A and B, respectively.

Other applications of the graph-based methodology described herein include: classifying songs, e.g., on websites. For example, as a further learning example including an example task of classifying foreign language (e.g., Chinese) songs and English songs, a Task 1 may involve classifying Chinese songs, while a Task 2 involves classifying English songs. Task 1 would provide two (2) views: 1) low-level audio features (e.g., pitch-class profile), and view 2) textual features (e.g., the Chinese language song lyric mapped to tokens resulting from applying TF-IDF processing of the Chinese song lyrics). Likewise, the Task 2 involving classifying English songs provides two views: 1) low-level audio feature (e.g., pitch-class profile), and view 2) textual features (e.g., the English language song lyric mapped to tokens resulting from applying TF-IDF processing of English song lyric). Thus, in multi-view, multi-task learning, for classifying songs, for each Task, an example view 1 involves classifying songs according to its low level audio features extracted, e.g., audio pitch-class profile; and an example view 2 consists of features extracted from the song lyrics as represented by language tokens. A common view for both Tasks 1 and 2 would be an audio feature such as pitch-class profile.

Further example uses are contemplated. For example, the methodology herein could be employed as an example regression task, which may be related to a component within a Question-Anwer (QA) computer system, e.g., the Watson QA system of International Business Machines, Inc. ("IBM"). In such a QA system a Task 1 involves scoring candidate answers in a first language, e.g. Chinese, to a question in that first language, e.g., Chinese, (Task 1), and Task 2 involves scoring answers to a question in a second language, e.g., English (Task 2), and which candidate answers may take on many values. Scoring candidate answers may be performed on both the Chinese and English answers, e.g., Chinese questions result in processing Chinese documents/sources to obtain Chinese candidate answers, while English questions result in processing English documents/sources to obtain English candidate answers. An application performed by the a QA system thus, may be to obtain scores to candidate answers of the set of Chinese questions (Task 1), and simultaneously obtain English candidate answers to the same questions in English (Task 2). However, it may be found that the Chinese language candidate answers may not be sufficient or limited. In this example, the methodology leverages the relatedness between the English domain and the Chinese domain to generate better answers for Chinese questions. Thus to adopt a QA system to another language, e.g., a language such as Chinese, then Watson may first translate a Chinese question to an English equivalent in order to find/obtain better English candidate answer from the English language processing as opposed to the Chinese language processing. In regression, the output is any numerical value (output is continuous). However, their common view may be language-invariant features, e.g., geographical information (e.g., geographic features), or their TD-IDF representation as tokens.

Further example use of the methodology described herein include applications for IP licensing to companies that sell multi-media analysis (requiring image classification) and music recommendation systems.

A further example use of the methodology described herein includes application(s) for Social Media Analysis (e.g., Banter). For example, label information from benchmark data sets may be leveraged to analyze online media, e.g., from Twitter, blog posts, etc.

A further example use of the methodology described herein include application(s) that leverage the knowledge learned for Jeopardy! to perform tasks in other domains, e.g., medical analytics, or for example provide a cross-lingual Jeopardy! wherein English learning is leveraged to extend a QA system to other languages.

Figure 9:
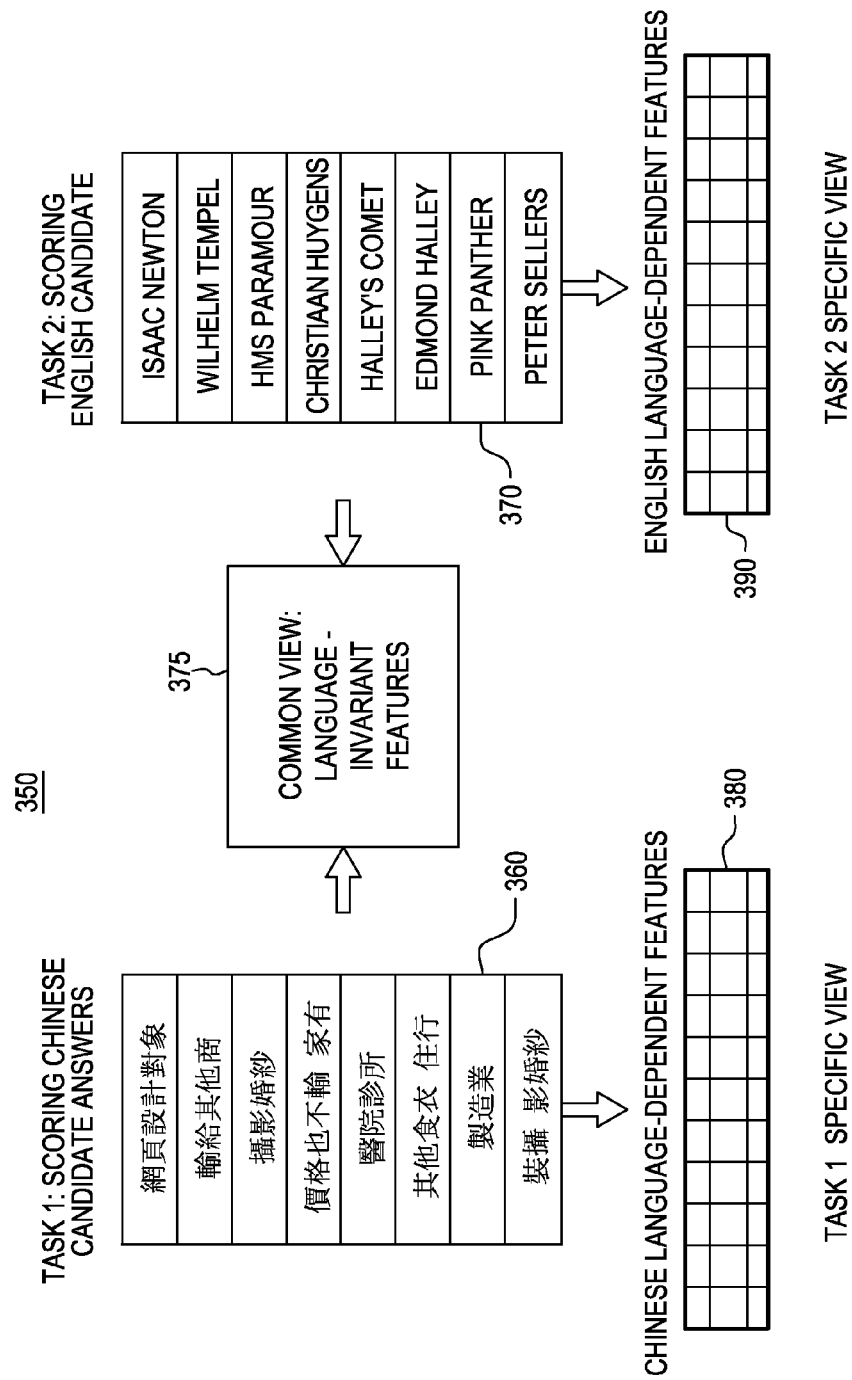
FIG. 9 shows an example M²TV learning problem implemented for extending an automated Question-Answer QA system to another language according to the techniques described herein.

For example, as shown in FIG. 9, shows an example M$^2$TV learning problem 350 which the system and methods described is configured to extend operability of a Question-Answering (QA) system in a first language to other languages. In such a solution, Task 1 is shown to provide the answer for a question in one language (e.g., Chinese), and Task 2 370 is to provide the answer for the same question in another language (e.g., English). Here, the examples (entities) 360 in Task 1 and entities 370 in Task 2 correspond to the candidate answers. The common view 375 of the two tasks includes language-invariant features (features that are independent of language), and the specific views of the two tasks, i.e., task specific view 380 corresponding to Task 1 and task specific view 390 corresponding to Task 2 consists of language-dependent features.

Figure 10:
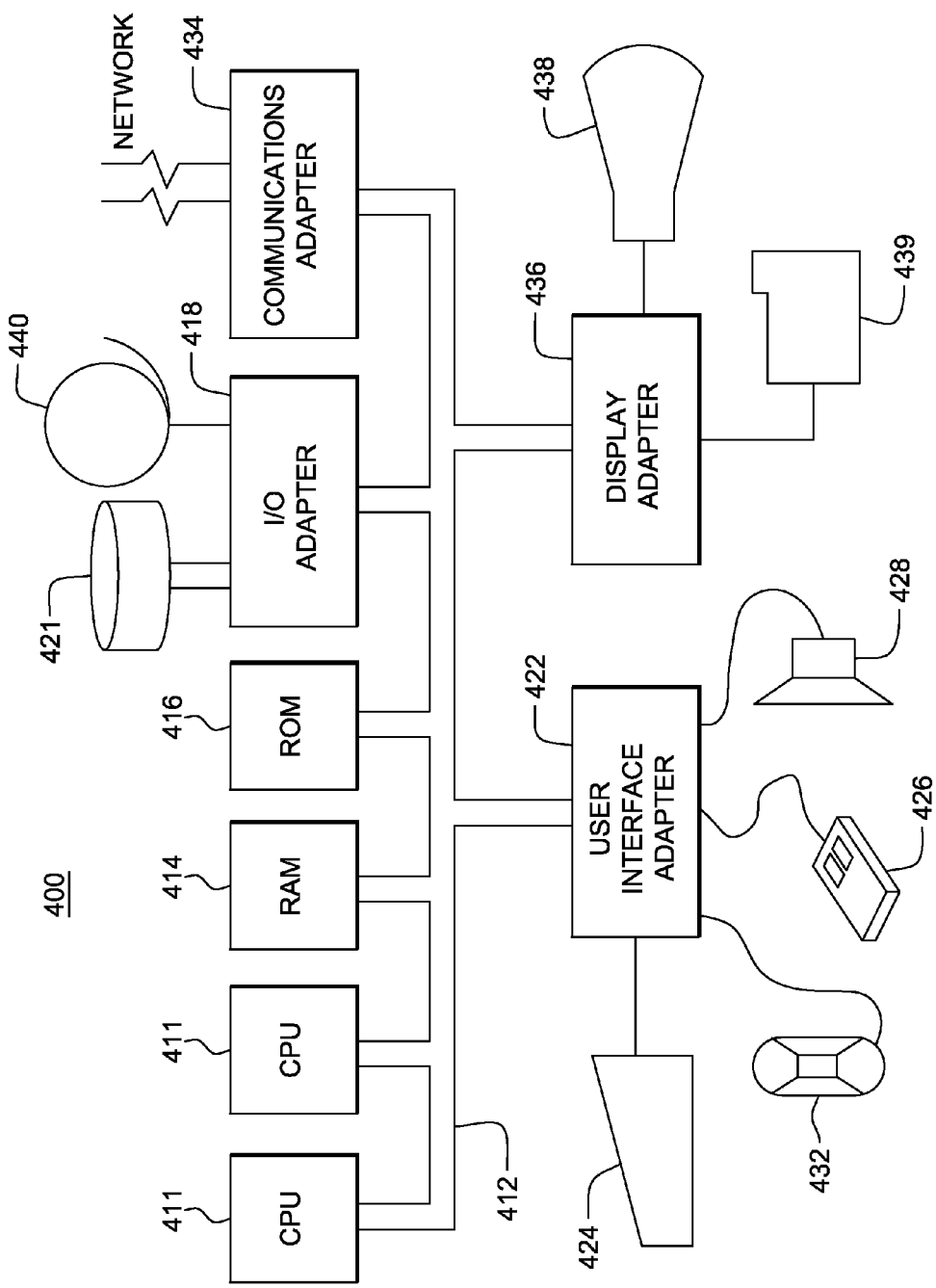
FIG. 10 illustrates an exemplary hardware configuration of a computing system 400 running and/or implementing the method steps described herein.

FIG. 10 illustrates an exemplary hardware configuration of a computing system 400 running and/or implementing the method steps described herein. The hardware configuration preferably has at least one processor or central processing unit (CPU) 411. The CPUs 411 are interconnected via a system bus 412 to a random access memory (RAM) 414, read-only memory (ROM) 416, input/output (I/O) adapter 418 (for connecting peripheral devices such as disk units 421 and tape drives 440 to the bus 412), user interface adapter 422 (for connecting a keyboard 424, mouse 426, speaker 428, microphone 432, and/or other user interface device to the bus 412), a communication adapter 434 for connecting the system 400 to a data processing network, the Internet, an Intranet, a local area network (LAN), etc., and a display adapter 436 for connecting the bus 412 to a display device 438 and/or printer 439 (e.g., a digital printer of the like).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with a system, apparatus, or device running an instruction.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with a system, apparatus, or device running an instruction. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more operable instructions for implementing the specified logical function(s).

It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While there has been shown and described what is considered to be preferred embodiments of the invention, it will, of course, be understood that various modifications and changes in form or detail could readily be made without departing from the spirit of the invention. It is therefore intended that the scope of the invention not be limited to the exact forms described and illustrated, but should be construed to cover all modifications that may fall within the scope of the appended claims.

What is claimed is:

1. A method for classifying entities from multiple channels in multi-task multi-view learning problems, wherein entities of different tasks are related with each other through shared or common features in multiple views, and a single learning task relating to a task specific feature in multiple views said method comprising:
    generating a bi-partite graph-based model relating one or more entities and features in each said view;
    forming an objective function to impose consistency of each task and similarity constraints on common views of different tasks based on graphs generated from said model, wherein for each task, a first function g( ) is defined on entities which takes on class label values; and, a second function f( ) is defined on each view which takes values on the features in the view, said second function feature values used to determine the class label of an entity having such features;
    iteratively solving said objective function over each said task to obtain values for said first functions and second functions; and,
    generating labels that classify said entities based on obtained values for said first functions,
    wherein said entities include a plurality of candidate answers to questions posed in a question answering system operable in a first language, wherein a first task includes providing an answer to a question in said first language to a question posed, and a second task includes providing an answer to a question in a second language, different from said first language, in response to an identical question, wherein the task specific feature includes a language dependent feature, and the shared feature includes a language invariant feature of said answer in said first and second languages,
    wherein as programmed processor device is configured to perform one or more of said model generating, said forming, said iteratively solving and said label generating.

2. The method as claimed in claim 1, wherein a generated bi-partite graph of said model relates tasks and views, each task having one or more views (V) with each view corresponding to one or more types of features, and each task having one or more labeled and unlabeled entities.

3. The method as claimed in claim 2, wherein said formed objective function includes a consistency measure for each task i, said consistency measure including a first component measuring consistency among different views, and a second component measuring a similarity on the common views of different tasks.

4. The method as claimed in claim 3, wherein said iteratively solving said formed objective function comprises:
    initializing said functions go defined on said entities;
    initialize intermediate normalized affinity matrices (T_ik) that encode connections between entities and features of a constructed graph, including initializing sub-matices (L_ik) thereof;
    iterating over said number of tasks; and,
    at each iteration, updating the second function f( ) defined on each view for the task-specific non-shared views defined for each task.

5. The method as claimed in claim 4, wherein said iteratively solving said formed objective function further comprises:
    iterating over the number of views:
    determining at each iteration whether a current view is shared by a task; and
    if determined that said current view is shared, updating the second function f( ) defined on said view for the shared view.

6. The method as claimed in claim 5, wherein said iteratively solving said formed objective function further comprises:
    iterating over said number of tasks i:
    calculating an intermediate parameter;
    update said first function g( ) defined for each task as a function of said calculated intermediate parameter and said sub-matrix (L_ik) of said normalized affinity matrix and said updated second function f( ).

7. The method as claimed in claim 1, wherein said generating labels that classify said entities based on obtained values for said first functions comprises:
    calculating a percentage of entities having positive label values in an initial set of entities;
    sorting said first functions g( ) according to their values in a descending order; and
    assigning a same positive label to top g( ) functions according to said percentage, and assign remaining first functions g( ) to be the opposite label values.

8. The method as claimed in claim 1, wherein said entities include a plurality of documents having images, a task including a classification task for classifying a document, wherein a shared feature includes a color histogram of an image in a document, and a task-specific feature including a word frequency in a document.

9. The method as claimed in claim 8, wherein a task including a classification task for classifying said images.

10. The method as claimed in claim 1, wherein said entities include a plurality of documents, said documents including on-line media messages, a task including a classification task for classifying a document, wherein a shared feature includes a common shared vocabulary among documents and said on-line messages, and a task-specific feature including a social network communications of on-line media messages originated by a user.

11. A computer-implemented system for classifying entities from multiple channels in multi-task multi-view learning problems, said entities of different tasks being related with each other through shared features in multiple views and a single learning task relating to a task specific feature in multiple views, said system comprising:
    a memory storage device;
    a processor device in communication with said memory storage device, said processor device configured to perform a method to:
    generate a bi-partite graph-based model relating one or more entities and features in each said view;

form an objective function to impose consistency of each task and similarity constraints on common views of different tasks based on graphs generated from said model, wherein for each task, a first function go is defined on entities which takes on class label values; and, a second function f( ) is defined on each view which takes values on the features in the view, said second function feature values used to determine the class label of an entity having such features;

iteratively solve said objective function over each said task to obtain values for said first functions and second functions; and, generate labels that classify said entities based on obtained values for said first functions, wherein said entities include a plurality of candidate answers to questions posed in a question answering system operable in a first language, wherein a first task includes providing an answer to a question in said first language to a question posed, and a second task includes providing an answer to a question in a second language, different from said first language, in response to an identical question, wherein the task specific feature includes a language dependent feature, and the shared feature includes a language invariant feature of said answer in said first and second languages.

12. The computer-implemented system as claimed in claim 11, wherein a generated bi-partite graph of said model relates tasks and views, each task having one or more views (V) with each view corresponding to one or more types of features, and each task having one or more labeled and unlabeled entities.

13. The computer-implemented system as claimed in claim 12, wherein said formed objective function includes a consistency measure for each task i, said consistency measure including a first component measuring consistency among different views, and a second component measuring a similarity on the common views of different tasks.

14. The computer-implemented system as claimed in claim 13, wherein to iteratively solve said formed objective function, said processor device is further configured to:
   initialize said functions go defined on said entities;
   initialize intermediate normalized affinity matrices (T_ik) that encode connections between entities and features of a constructed graph, including initializing sub-matices (L_ik) thereof;
   iterate over said number of tasks; and,
   at each iteration, updating the second function f( ) defined on each view for the task-specific non-shared views defined for each task.

15. The computer-implemented system as claimed in claim 14, wherein to iteratively solve said formed objective function, said processor device is further configured to:
   iterate over the number of views:
   determine at each iteration whether a current view is shared by a task; and
   if determined that said current view is shared, update the second function f( ) defined on said view for the shared view.

16. The computer-implemented system as claimed in claim 15, wherein to iteratively solve said formed objective function, said processor device is further configured to:
   iterate over said number of tasks i:
   calculate an intermediate parameter;
   update said first function go defined for each task as a function of said calculated intermediate parameter and said sub-matrix (L_ik) of said normalized affinity matrix and said updated second function f( ).

17. The computer-implemented system as claimed in claim 11, wherein to generate labels that classify said entities based on obtained values for said first functions, said processor device is further configured to:
   calculate a percentage of entities having positive label values in an initial set of entities;
   sort said first functions g( ) according to their values in a descending order; and
   assign a same positive label to top g( ) functions according to said percentage, and assign remaining first functions go to be the opposite label values.

18. A computer program product for classifying entities from multiple channels in multi-task multi-view learning problems, said entities of different tasks being related with each other through shared features in multiple views and a single learning task relating to a task specific feature in multiple views,
   the computer program product comprising a non-transitory storage medium readable by a processing circuit and storing instructions run by the processing circuit for performing a method, the method comprising:
   generating a bi-partite graph-based model relating one or more entities and features in each said view;
   forming an objective function to impose consistency of each task and similarity constraints on common views of different tasks based on graphs generated from said model, wherein for each task, a first function g( ) is defined on entities which takes on class label values; and, a second function f( ) is defined on each view which takes values on the features in the view, said second function feature values used to determine the class label of an entity having such features;
   iteratively solving said objective function over each said task to obtain values for said first functions and second functions; and,
   generating labels that classify said entities based on obtained values for said first functions,
   wherein said entities include a plurality of candidate answers to questions posed in a question answering system operable in a first language, wherein a first task includes providing an answer to a question in said first language to a question posed, and a second task includes providing an answer to a question in a second language, different from said first language, in response to an identical question, wherein the task specific feature includes a language dependent feature, and the shared feature includes a language invariant feature of said answer in said first and second languages.

19. The computer program product as claimed in claim 18, wherein a generated bi-partite graph of said model relates tasks and views, each task having one or more views (V) with each view corresponding to one or more types of features, and each task having one or more labeled and unlabeled entities.

20. The computer program product as claimed in claim 19, wherein said formed objective function includes a consistency measure for each task i, said consistency measure including a first component measuring consistency among different views, and a second component measuring a similarity on the common views of different tasks.

21. The computer program product as claimed in claim 20, wherein said iteratively solving said formed objective function comprises:
   initializing said functions go defined on said entities;
   initialize intermediate normalized affinity matrices (T_ik) that encode connections between entities and features of a constructed graph, including initializing sub-matices (L_ik) thereof;
iterating over said number of tasks; and,
at each iteration, updating the second function f( ) defined on each view for the task-specific non-shared views defined for each task.

22. The computer program product as claimed in claim 21, wherein said iteratively solving said formed objective function further comprises:
iterating over the number of views:
determining at each iteration whether a current view is shared by a task; and
if determined that said current view is shared, updating the second function f( ) defined on said view for the shared view.

23. The computer program product as claimed in claim 22, wherein said iteratively solving said formed objective function further comprises:
iterating over said number of tasks i:
calculating an intermediate parameter;
update said first function go defined for each task as a function of said calculated intermediate parameter and said sub-matrix (L_ik) of said normalized affinity matrix and said updated second function f( ).

24. The computer program product as claimed in claim 17, wherein said generating labels that classify said entities based on obtained values for said first functions comprises:
calculating a percentage of entities having positive label values in an initial set of entities;
sorting said first functions g( ) according to their values in a descending order; and
assigning a same positive label to top g( ) functions according to said percentage, and assign remaining first functions go to be the opposite label values.

25. The computer program product as claimed in claim 18, wherein said entities include a plurality of documents having images, a task including a classification task for classifying a document, wherein a shared feature includes a color histogram of an image in a document, and a task-specific feature including a word frequency in a document.

26. The computer program product as claimed in claim 25, wherein a task including a classification task for classifying said images.

27. The computer program product as claimed in claim 18, wherein said entities include a plurality of documents, said documents including on-line media messages, a task including a classification task for classifying a document, wherein a shared feature includes a common shared vocabulary among documents and said on-line messages, and a task-specific feature including a social network communications of on-line media messages originated by a user.

* * * * *